No. 883,839. PATENTED APR. 7, 1908.
B. A. SWASEY.
FRUIT PICKING BASKET.
APPLICATION FILED MAY 15, 1907.
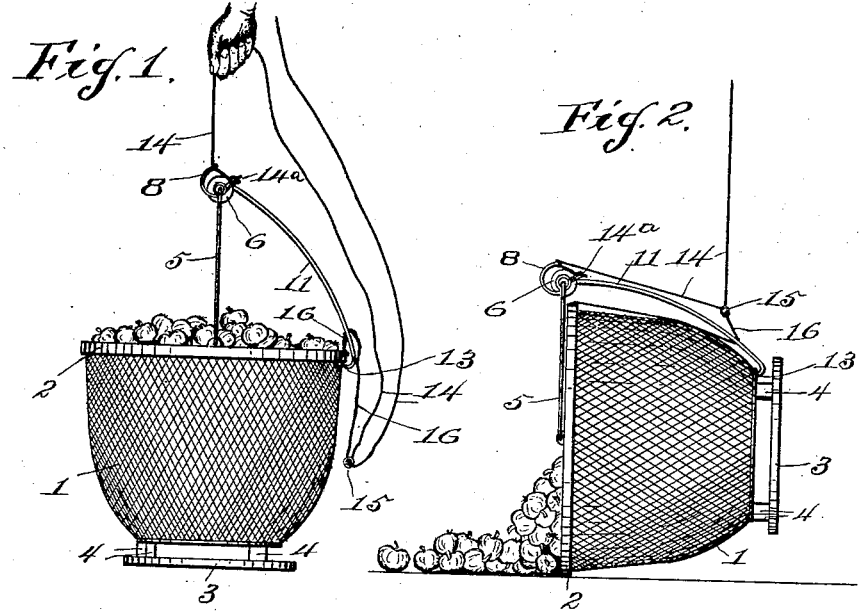
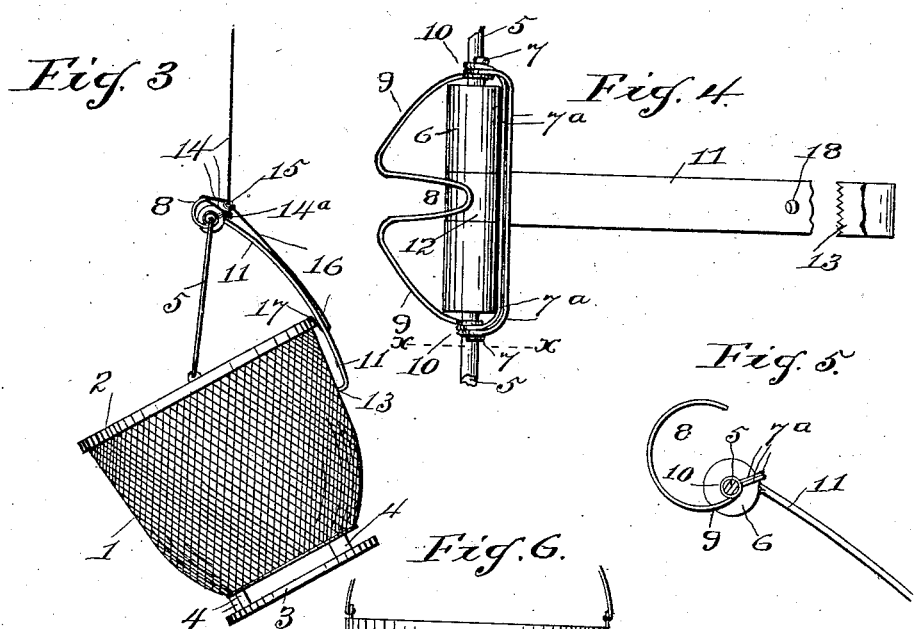
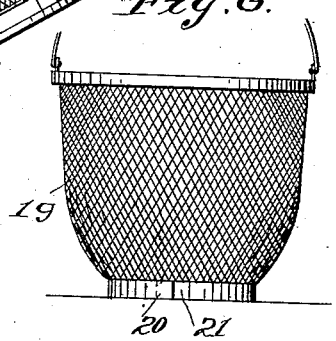
Witnesses:
C. J. Belt
Wm C. Valk Jr.
Inventor.
Benjamin A. Swasey
By Faber & Whitman Co.
Attorneys.

UNITED STATES PATENT OFFICE.

BENJAMIN A. SWASEY, OF WEST PERU, MAINE.

FRUIT-PICKING BASKET.

No. 883,839.　　　Specification of Letters Patent.　　　Patented April 7, 1908.

Application filed May 15, 1907. Serial No. 373,797.

*To all whom it may concern:*

Be it known that I, BENJAMIN A. SWASEY, a citizen of the United States, residing at West Peru, in the county of Oxford and State of Maine, have invented certain new and useful Improvements in Fruit-Picking Baskets, of which the following is a specification.

This invention relates to fruit-picking baskets or buckets and pertains especially to means carried by the bail of the bucket, basket or similar receptacle for hoisting, hanging, lowering and tilting the same.

The object of the invention is to provide novel and peculiar means carried by the bail of a basket, bucket or similar article and adapted to be operated in a suspended position for dumping the contents of the basket.

A further object of the invention is to provide a fruit-picking basket with means for hanging the basket during the picking, and with means for holding the basket-bail in position for picking and for dumping the contents of the basket.

A still further object of the invention is to provide a basket-bail with a hook for hanging the basket in a tree during fruit-picking, a lever pivoted to the bail and operated by a cord through the hook for holding the basket in position for fruit-picking and for hoisting, lowering and tilting the basket.

Various other objects advantages and improved results are attainable by and through the construction and arrangement of parts hereinafter described and pointed out in the claims to follow.

In the accompanying drawings forming part of this application: Figure 1 is an elevation showing the basket in lowering position. Fig. 2 is a similar view showing the basket in dumping position. Fig. 3 is a similar view showing the hoisting position of the basket. Fig. 4 is a detail top view of the handle portion of the bail showing the hook and lever, the latter partly broken away. Fig. 5 is a section on the line $x$—$x$, Fig. 4. Fig. 6 is an elevation of the bottom part of a basket showing a basket having a notch in its rim for the passage of the toothed end of the lever.

The same reference numerals denote the same parts throughout the several views of the drawings.

A bucket, pail or other suitable article adapted for holding fruit may have the subject of this invention applied thereto, but I preferably use a basket 1, having a top rim or hoop 2, and a base 3 joined to the basket by legs 4, so as to leave an interval or space between the bottom of the basket and the base, for the purpose hereinafter explained. The basket has an ordinary bail 5, provided with the usual handle 6.

For suspending the basket from the limb of a tree, I employ a single piece of wire 7 having a central hook 8, whence arms 9 extend to each end of the handle 6, where the wire is coiled at 10 around the bail 5, from whence the wire is crossed over the handle and twisted to the bail at each end of the handle.

The means for holding the basket bail in desired positions for hoisting, lowering and dumping, consists of a curved lever 11 pivoted at 12 to the handle 6 under the crossing-wire $7^a$, an inturned toothed-lip 13, engages the basket rim 2, and works through the interval or space between the basket-base and the basket-bottom to engage the latter. The lever and bail is operated to effect said engagements of the lip, by a cord 14, having one end secured to the crossing-wire at $14^a$, and the cord is worked through the hook 8, and through a ring 15, carried by a short piece of cord 16 secured to the basket at 17 and working through an aperture 18 in the lower portion of the lever.

Referring to the modification shown in Fig. 6, in lieu of the base and its legs, the bottom of the basket 19, is provided with a rim 20, having a notch 21, through which the toothed-end of the lever is operated. The basket may be hung in a tree by means of the hook and after it has been filled and unhooked the cord is grasped just over the hook, and the basket is allowed to descend while the cord slides upwardly through the ring 15, and downwardly through the hand of the operator. When the basket reaches the ground the descending portion of the cord is dropped sufficiently to allow the lever to drop (of its own weight) with the toothed-lip under the basket where it engages the basket bottom, the cord is pulled or jerked to tilt the basket for dumping; then the cord is pulled through the ring, in the opposite direction to that of lowering, until the short cord and the cord between the hook and the ring is taut; a sudden pull or jerk of the cord will carry the toothed end of the lever back under the basket-rim and hold the lever fixed thereto as the basket is hoisted.

Having thus described my invention what

I claim as new and desire to secure by Letters Patent is:

1. A basket having a swinging bail, and a lever having one end pivotally connected to the bail and the other end provided with teeth to engage the basket for holding the bail in various positions.

2. A basket having a swinging bail, and a lever having one end pivotally connected to the bail and the other end provided with teeth to engage the basket for holding the bail in various positions, and a cord working through the lever and connecting it with the basket.

3. A basket having a swinging bail, and a lever having one end pivotally connected to the bail and the other end provided with teeth to engage the basket for holding the bail in various positions, a cord working through the lever and connecting it with the basket, and a hoisting and lowering cord connected with the bail and coöperating with said lever cord.

4. A basket-hanger comprising a basket-bail, a handle on the bail, a single piece of wire having a hook, the wire being coiled about the basket bail at each end of the basket handle and extended across said handle and secured to the bail adjacent said coils.

5. The combination, with a basket, a swinging bail thereon having a handle, a hook attached to the basket bail, and a lever pivoted to the handle under the hook and having its free end provided with teeth, of a cord working through the lever and attached to the basket, a hoisting and lowering cord anchored to the handle and working through the hook, and a ring on the said lever cord for the passage of the said hoisting cord.

In testimony whereof I affix my signature in presence of two witnesses.

BENJAMIN A. SWASEY.

Witnesses:
S. F. ROBINSON,
R. S. TRACY.